July 3, 1956 R. B. JACOBS ET AL 2,752,777
FLASH POINT DETERMINATION AND RECORDING
Filed Oct. 27, 1950 2 Sheets-Sheet 1

*INVENTORS:*
ROBERT B. JACOBS
EVON C. GREANIAS
BY: *Everett A. Johnson*
ATTORNEY:

United States Patent Office 2,752,777
Patented July 3, 1956

2,752,777

FLASH POINT DETERMINATION AND RECORDING

Robert B. Jacobs, Homewood, and Evon C. Greanias, Chicago, Ill., assignors to Standard Oil Company, Chicago, Ill., a corporation of Indiana Application October 27, 1950, Serial No. 192,516

4 Claims. (Cl. 73—36)

This invention relates to the determination of the flash point of hydrocarbon liquids and more specifically relates to apparatus for such determination.

The American standard methods for the determination of flash points include the Tag Closed Cup, Pensky-Martens Closed Cup, and the Cleveland Open Cup. In each of these methods the oil sample is heated at a prescribed rate and a test flame of precise size is inserted periodically into the vapor above the sample. The oil temperature at which the vapor explodes is designated as the "flash point." Of the three standard flash point tests, the Pensky-Martens is the most rapid, but it sacrifices some accuracy, and in certain applications the slower Tag Closed Cup is specified. Even the fastest flash point test requires at least approximately ten minutes per sample and when maximum accuracy is desired approximately twenty minutes are needed. In view of the long time necessary and the great care required for the individual samples under the conventional methods for the determination of flash point, it is not convenient to handle a large number of samples on an assembly line basis.

In a large petroleum laboratory, six to seven thousand flash point tests per month are not unusual, and it is apparent that there is a great expenditure of skilled manpower when the test must be run individually and requires 20 to 25 minutes to complete. Heretofore no satisfactory system has been devised for the mass testing. However, commercially available devices have been introduced which proposed to detect the presence of low flash contaminants in oils of higher flash point by bubbling air through the sample and then into a combustible gas indicator, but such systems cannot be used effectively to measure flash points. In such systems, the requisite control of sensitivity and zero readings is not attainable and the vapor in the air stream reaching the instrument is not necessarily in equilibrium with the liquid under test. Accordingly, this type of device has not been found acceptable for flash point determinations.

It is therefore an object of this invention to provide an apparatus which is particularly adapted for use in analyzing a multiplicity of samples. Another object of the invention is to provide a novel flash point indication system which has an accuracy which is comparable to the best of the standard methods. Still another object is to provide such a system which requires a substantially shorter period of time for test than the most rapid standard methods. A more specific object of the invention is to provide an electrical system for automatically determining and recording an indication of the flash point. A further object is to provide a reliable flash point instrument which can be operated with a minimum of attention. Another object is to provide a filament assembly which maintains its uniform characteristics. These and other objects of the invention will become apparent as the description thereof proceeds.

We have devised a system for automatically obtaining an indication of the flash point of liquids by means of an apparatus comprising a Wheatstone bridge, in adjacent legs of which are placed two identical catalytic oxidizing surfaces in the form of portable filaments. One filament is exposed to the oil vapors and the other is not. The bridge current normally heats both filaments equally but in the presence of oil vapors the catalytic oxidation of the oil vapors raises the temperature of the exposed filament and therefore its resistance. This results in a change in the ratio of the filament resistances and a voltage is developed across the bridge which is correlated with flash points.

By our system a large number of samples are tested at the same constant temperature, each individual sample being placed in a partially filled closed container or flask and immersed in a constant temperature bath. When the sample vapor has come to temperature and vapor pressure equilibrium, the heated catalytic oxidizing surface in the form of the portable metal filament is inserted into the vapor space of the sample container and combustion occurs at the test filament causing the rise in temperature. To eliminate extraneous temperature effects, a second "reference" filament, not exposed to combustible vapors, is connected in the adjacent arm of the Wheatstone bridge.

The rise in the test filament's temperature depends upon the rate of combustion and the resulting unbalance of the Wheatstone bridge is correlated with the flash point of the sample. The equilibrium temperature assumed by the metal filament in air containing combustible vapors of the test sample depends upon the rate at which heat of combustion is supplied to the filament. This rate in turn depends upon the vapor pressure and heat of combustion per mol of vapor. Most petroleum fractions and petroleum products have approximately the same available heat of combustion per unit volume at the flash point, i. e. the explosive limit of the vapor. The vapor pressure of each of these fractions changes proportionally in going from its flash point temperature to the bath temperature, and the available heat of combustion per unit volume of vapor for each sample at the bath temperature is inversely proportional to the temperature differential between the bath temperature and the flash point temperature. Accordingly by measuring the available heat of combustion at bath temperature, an indication is obtained of the temperature at which the available heat is sufficient to support a flash. When the temperature differential is not more than about 75° F., filament temperature can be correlated with flash point of a known standard.

The successful determination of flash points by this type of system depends to a great extent upon the uniformity of the comparative filaments. However, when the temperature of the filament increases during the catalytic oxidation thereon, the filament changes in length and shape and therefore changes its thermal radiation characteristics and hence changes the measured filament temperature.

To avoid these difficulties, we have devised a spring loaded straight platinum filament which is described and claimed in our copending application Serial No. 192,515, filed October 27, 1950. The portable filament is supported in tension between a pair of spaced mounting springs fixed to a pair of parallel conductor posts embedded in a generally cylindrical insulating body encased within a brass sleeve. The filament assembly or probe is adapted to be inserted within a test flask, thereby placing the filament within the vapor space of the flask in a zone which is at equilibrium with regard to temperature and vapor concentration. The filament is in a horizontal or transverse position with respect to the longitudinal axis of the probe and this places the filament near the surface of the liquid sample in the flask. This is essential to avoid vapor pressure and temperature gradients which might occur between the surface of the liquid and the neck of the flask.

Further details of the invention are illustrated by the accompanying drawings wherein.

Figure 1:
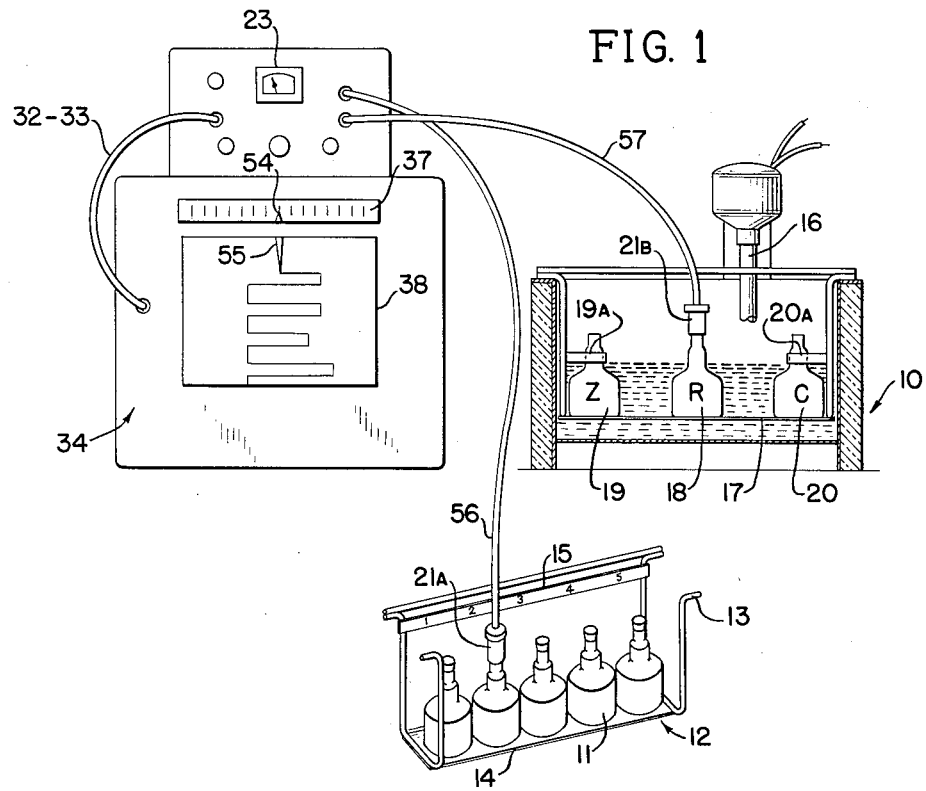
Figure 1 is a schematic view, with some parts removed, illustrating the general assembly of the apparatus.

Referring to Figure 1, a shallow and wide constant temperature bath 10 holds a number of sample containers or chambers 11 mounted in groups on rack 12 adapted to be hung within the bath 10. The rack 12 includes the hook frame 13, the platform 14, to which the containers may be permanently fixed, and the strip 15 which is numbered to identify the five samples.

The bath temperature determines the useful flash point range of the instrument and, in general, this range is limited to about 75° F. above the bath temperature since beyond such upper limit sensitivity diminishes rapidly. The maximum temperature variations between any two points in the bath at any time is kept less than 0.4° F. by vigorous circulation of the bath liquid and a stirrer 16 may be provided for that purpose. A second rack 17 is kept in the bath 10 at all times and it supports fixed reference container 18, removable zero container 19, and removable check container 20 to be described in greater detail below.

Figure 3:
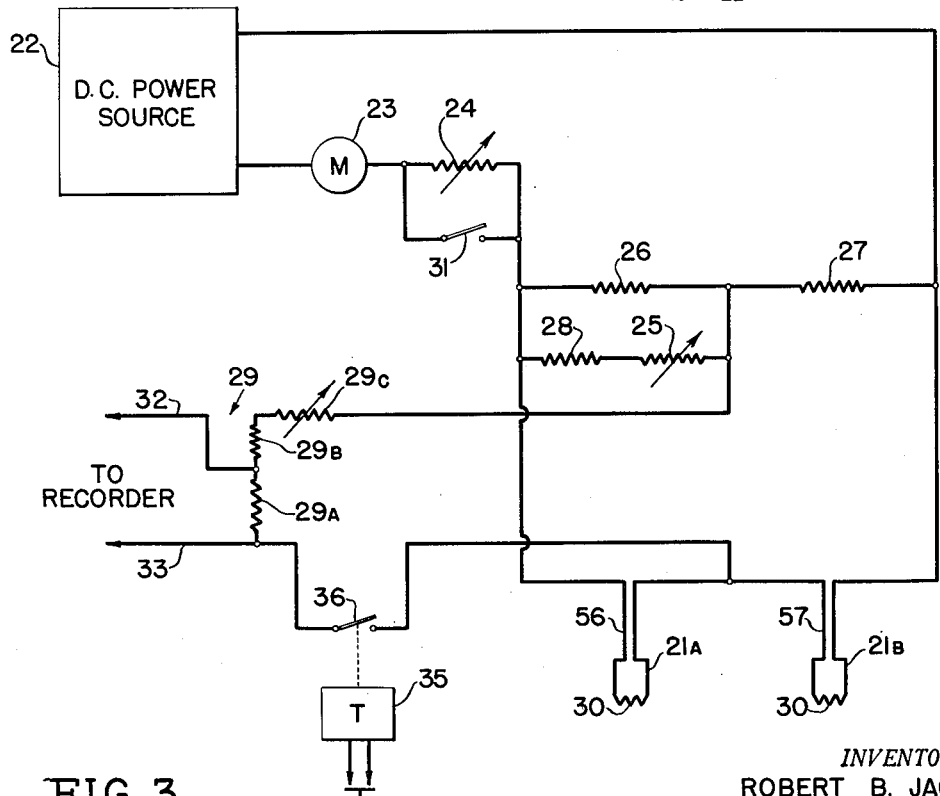
Figure 3 is a diagrammatic showing of the electrical elements of our measuring and indicating circuit.

A pair of probes 21a and 21b are connected in the electrical test circuit illustrated in Figure 3. A direct current power source 22, which may comprise a transformer and a rectifier or a battery, is applied to the bridge circuit including ammeter 23, variable resistors 24 and 25, fixed resistors 26, 27, and 28; output voltage divider 29 comprised of resistors 29a, 29b, and 29c; filaments 30; switch 31; and the associated conductors.

In a typical apparatus, the meter 23 reads from 0 to 1000 ma.; resistor 24 is variable from 0 to 3 ohms; resistor 25 is variable from 0–100 ohms; fixed resistors 27 and 28 have a value of 50 ohms each; and fixed resistor 26 a value of 100 ohms. The direct current source 22 supplies 1 amp. at 6.3 volts. For the output voltage divider 29, resistor 29a is fixed at 700 ohms, 29b is 200 ohms, and 29c is variable from 0–500 ohms.

The output of the bridge circuit is transmitted by leads 32 and 33, across which is the output voltage divider 29, to an indicator or recorder means 34. A cycle timer 35, initiated by a push button, controls the input to the recorder circuit through switch 36 so that the heaing-up time is not recorded. By adjustment of the output voltage divider 29 and using a voltmeter type indicator 34 having a scale 37 calibrated in flash points, we indicate flash point values directly. These values can be continuously recorded on chart 38.

Figure 2:
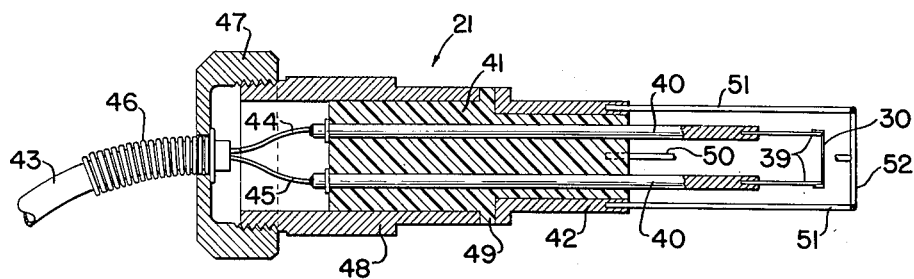
Figure 2 is a longitudinal section of our probe.

Referring to Figure 2, the details of our portable probes 21 are illustrated. The filaments 30 (corresponding to filaments 30 in Figure 3) may be of platinum wire, for example, of about 0.003 inch diameter and about 0.266 inch in length mounted between stainless steel mounting springs 39 under a tension of about 3.5 grams. The springs 39 may be about ⅜ inch in length and 0.04 x ¹⁄₃₂ inch in cross section. These mounting springs 39 are fastened to substantially parallel conducting posts 40 embedded in a generally cylindrical body portion 41 made of insulating material such as "Lucite." A brass flanged sleeve 42 surrounds the lower portion of the elongated body 41 and this sleeve 42 is adapted for snug fit in the neck of the particular flask or container.

A shielded cable 43 having conductors 44 and 45 passes through cable spring 46 anchored in nut 47 which is threaded about the cylindrical cable connector shield 48 encircling a substantial proportion of the body 41 and separated by annular insulating shoulder 49 from sleeve 42.

The conductors 44 and 45 are electrically connected to the posts 40 in circuit with springs 39 and filaments 30. A protective cage 50 having bars 51 extending longitudinally from the rim of brass sleeve 42 to a terminal 52 is provided to prevent damage to the mounting springs 39 and the filaments 30.

Preliminary to making a flash point determination employing our apparatus, the bath oil is placed in the bath 10 to the indicated level below the mouth of the containers and the temperature of the oil is brought to about 100° F. by a conventional thermostatically controlled heating unit (not shown). The container or chambers rack 17 is fitted with reference, zero, and check containers 18, 19 and 20, respectively. The check container 20 is removably held by clip 20a and contains 20 cc. of pure decane. Zero container 19 is held by clip 19a to rack 17 and contains about 20 cc. loose, fresh activated charcoal. When the test probe 21a is in the check container 20 (containing decane), the deflection of the indicator 54 is adjusted by means of the output voltage divider 29 to an indicated mark on scale 37 calibrated directly in terms of flash points. The reference probe 21b is kept permanently in empty reference container 18 in the bath 10 to maintain it at the ambient filament temperature.

In the illustrated circuit we employ a push button controlled cycle timer 35 and typically the voltage is repeatedly applied to the recorder 34 for only about the last half of the test period. This accentuates the indicated deflection of the pointer 54 and pen 55 and eliminates the drawing of a record during the period in which the filament 30 is attaining equilibrium within a test flask 11. This gives an easily noted reading which is proportional to the relative temperature of the test filament 30 after it has attained equilibrium conditions.

Figure 4:
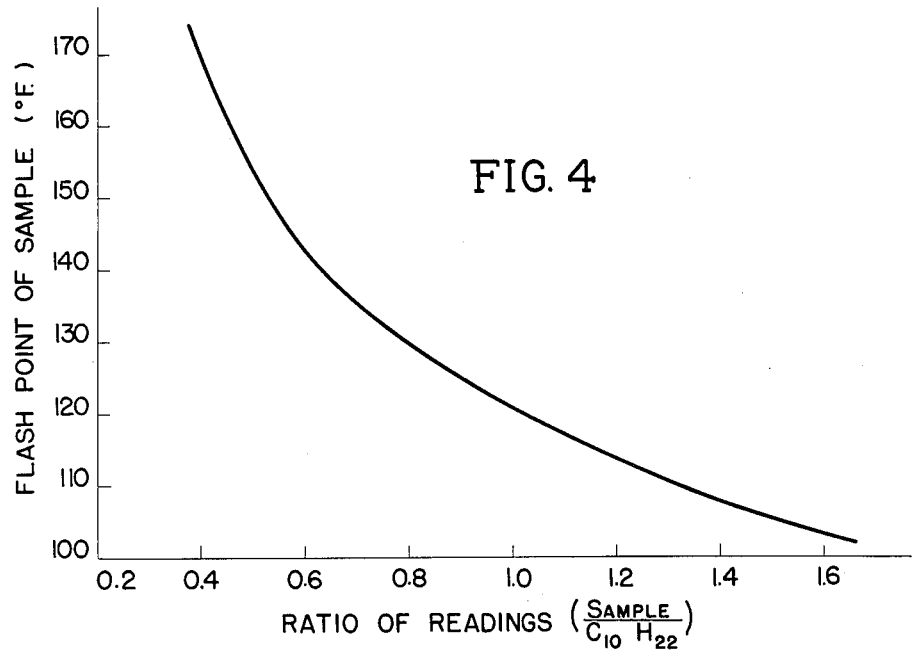
Figure 4 is a calibration curve correlating the ratio of readings with flash point of samples.

The bridge output for each sample bears a definite ratio to the corresponding bridge output for a standard such as decane and a calibration curve plotted on this basis is shown in Figure 4 for the flash point range of 100 to 175° F.' A large number of tests were made with the catalytic filament on samples of known flash points and the ratios of the recorder readings of the sample and of the standard were plotted to provide the curve of Figure 4. The flash points of other blended samples were determined by precision Tag Closed Cup tests and these check points fell on a smooth curve well within the points obtained earlier. Thus, when the ratio of the sample reading to the check reading obtained with pure decane is applied to the curve, the flash point can be read off directly.

To calibrate the device, the test probe 21a is placed in the zero container 19 and the bridge current as indicated by meter 23 is adjusted by means of variable resistance 24 to a prescribed value. This is the heating current required to make the platinum filaments 30 catalytic. Thus with a current of about 0.75 amp. the filament is brought to about 850° F. and temperatures between about 700° F. and about 1000° F. can be used. With the test probe 21 still in the zero container 19, the bridge is then balanced by means of variable resistance 25 as indicated by the recorder 34 when timer 35 is operated. The test probe 21 is then removed from the zero container 19 and immediately placed in the check container 20 containing the pure decane. The timer 35 is operated and the deflection on scale 37 is noted. Variable resistor 29c is manipulated to bring the deflection to the calibrated mark on scale 37. The zero should then be checked and corrected by means of variable resistor 25. Repeated adjustment of the sensitivity and zero controls may be necessary. When these have been made the sensitivity of the instrument has been adjusted so that the calibrated scale 37 applies. However, if the deflection cannot be brought up to the calibrated mark, the sensitivity can be increased by removing the test probe 21a and while holding it in air passing a greater current therethrough by closing the condition switch 31. With the filament 30 sufficiently sensitive, the output voltage divider 29 is adjusted to bring the deflection obtained with decane (or other standard) up to the calibrated mark on the scale 37.

To perform a test the metal sample containers 11 are carefully cleaned so that no trace of previous samples or solvent remains. Satisfactory results have been obtained by thoroughly rinsing the containers with carbon tetrachloride and drying with an air stream before filling. Exactly 20 cc. of the sample is placed in each sample container and immediately corked. These sample containers fixed to container rack 12 are then placed in the bath 10 and brought to the oil bath temperature.

The test probe 21 is placed in the first of sample containers 11 and the deflection of the recorder 34 observed and recorded. Five samples can be tested in rapid succession but after each five samples it may be necessary to make another sensitivity test in the check container 20 and the variable resistor 29c should be changed accordingly. If the deflection on the calibrated scale 37 now deviates more than ±5.0° from the calibrated mark, the "zero" reading should be checked and, if necessary, corrected by adjusting the variable resistance 25.

When low boiling sulfur compounds such as $H_2S$ and other sulfur compounds boiling below the bath temperature are present, erratic flash point readings are obtained. To obviate this difficulty we can employ a perforated metal thimble or cylindrical basket filled with a sulfur acceptor such as barium hydroxide or the like disposed within the vapor space of the sample containers while bringing the sample to temperature and vapor equilibrium. In a preferred embodiment the top rim of the thimble is provided with several longitudinal prongs for projection into the underside of the flask stopper thereby suspending the basket of sulfur acceptor in the vapor space of the sample container. This removes the sulfur compound from the vapors and the basket is withdrawn before the heated test filament is introduced into the sample flask or container.

Although our invention has been described in terms of specific apparatus which is set forth in considerable detail, it should be understood that this is by way of illustration only and that the invention is not necessarily limited thereto, since alternative embodiments and operating techniques will become apparent to those skilled in the art in view of our disclosure. Accordingly, modifications in the invention are contemplated without departing from the spirit of the described invention or the scope of the appended claims.

We claim:

1. In an apparatus for determining the flash point of hydrocarbon liquids by measuring the rate of oxidation of the vapors thereof, the improvement comprising in combination a constant temperature bath, a stoppered sample flask in said bath, a stoppered reference flask in said bath, each of said flasks comprising a bottom liquid reservoir section and an upper vapor trap section, an electrically heated catalytic filament means extending within each of said flasks and into said vapor trap section, and electrical circuit means comprising a Wheatstone bridge having said filaments in adjacent arms.

2. In an apparatus for determining the flash point of hydrocarbon liquids by measuring the rate of oxidation of the vapors thereof, the improvement comprising in combination a sample flask, said sample flask comprising a bottom liquid reservoir section and an upper vapor trap section, a reference flask, means for simultaneously maintaining said flasks at a selected constant temperature, a first electrically heated catalytic filament means disposed within said reference flask, a second electrically heated catalytic filament means adapted to be disposed in said sample flask within the said vapor trap section transversely to the longitudinal axis thereof and in proximity to the liquid level of the flask, and electrical circuit means comprising a Wheatstone bridge circuit having the said filament means connected in adjacent arms.

3. In a device for obtaining a measure of the flash point of hydrocarbon liquids, a first stoppered flask containing a reference gas, a removable catalytic filament of a material selected from the group consisting of the elements of the platinum group within said first flask, a second stoppered flask containing the liquid hydrocarbon sample and vapors thereabove, said flasks being of similar configuration and having a relatively broad base and a stoppered neck, a catalytic filament in said second flask similar to that in the first flask, a constant temperature bath, a rack for said flasks submerged in said bath, the bases of said flasks being fixed to said rack, a source of direct current and conductors for connecting said source with said filaments, and a measuring instrument in circuit with said filaments for comparing the amount of current passing through one of said filaments with the current passing through the other of said filaments.

4. In an apparatus for determining the flash point of hydrocarbon liquids by measuring the rate of oxidation of hydrocarbon vapors, the combination of a constant temperature bath, a broad-based sample flask having a stoppered mouth, a rack means submerged in said bath for supporting said flask and a plurality of additional flasks therein one of said additional flasks comprising a reference flask, a pair of test probes adapted to be inserted within said flasks, the said probes including a stopper means for said flasks and a heated catalytic filament supported by said stopper, and electrical circuit means including said filament for determining changes in the electrical characteristics of said filament due to the catalytic oxidation of hydrocarbons thereon.

References Cited in the file of this patent

UNITED STATES PATENTS

| | | |
|---|---|---|
| 1,236,123 | Tagliabue | Aug. 7, 1917 |
| 1,888,984 | Gruss et al. | Nov. 29, 1932 |
| 1,974,498 | Lewis | Sept. 25, 1934 |
| 2,023,731 | Johnson et al. | Dec. 10, 1935 |
| 2,080,953 | Rensch | May 18, 1937 |
| 2,285,280 | Johnson | June 2, 1942 |
| 2,297,868 | Bergeron | Oct. 2, 1942 |
| 2,349,250 | Doan | May 23, 1944 |
| 2,437,720 | Ackley | Mar. 16, 1948 |

FOREIGN PATENTS

| | | |
|---|---|---|
| 552,706 | Germany | June 17, 1932 |

OTHER REFERENCES

Gas Analysis and Testing of Gaseous Materials by V. J. Altieri, 1945, Ameri. Gas Assoc. Inc., New York, 1st edition, p. 135.